(12) United States Patent
Matsuo et al.

(10) Patent No.: US 8,391,351 B2
(45) Date of Patent: *Mar. 5, 2013

(54) WIRELESS COMMUNICATION APPARATUS AND TRANSMISSION CONTROL METHOD

(75) Inventors: Ryoko Matsuo, Tokyo (JP); Toshihisa Nabetani, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1627 days.

This patent is subject to a terminal disclaimer.

(21) Appl. No.: 11/684,244

(22) Filed: Mar. 9, 2007

(65) Prior Publication Data

US 2007/0280181 A1    Dec. 6, 2007

(30) Foreign Application Priority Data

May 30, 2006  (JP) ................................ 2006-150539

(51) Int. Cl.
*H04B 1/66*  (2006.01)

(52) U.S. Cl. .......................... 375/240; 370/470; 370/338
(58) Field of Classification Search .................. 370/470, 370/338, 388; 375/240

See application file for complete search history.

(56) References Cited

U.S. PATENT DOCUMENTS

| 6,389,072 B1* | 5/2002 | Tzou et al. .................... 375/240 |
| 2004/0017790 A1* | 1/2004 | del Prado et al. ............. 370/333 |
| 2007/0126612 A1* | 6/2007 | Miller ............................. 341/67 |

FOREIGN PATENT DOCUMENTS

| JP | 2002-101151 | 4/2002 |
| JP | 2004-64538 | 2/2004 |
| JP | 2004-260658 | 9/2004 |

* cited by examiner

*Primary Examiner* — Christopher Brown
(74) *Attorney, Agent, or Firm* — Oblon, Spivak, McClelland, Maier & Neustadt, L.L.P.

(57) ABSTRACT

A wireless communication apparatus generates aggregated frame including frames and having frame length, transmits aggregated frame at transmission rate of transmission rates, stores, in memory, for each of transmission rates, threshold frame length defined between first frame length range and second frame length range, if frame length is within second frame length range not more than threshold frame length, throughput increase rate not less than predetermined threshold value being obtained by increasing frame length, selects, by comparing threshold frame length at transmission rate with frame length, at least one of (a) another transmission rate of transmission rates and (b) new frame length of aggregated frame, sets transmission rate to selected another transmission rate if another transmission rate is selected, and sets frame length to new frame length if new frame length is selected.

40 Claims, 11 Drawing Sheets

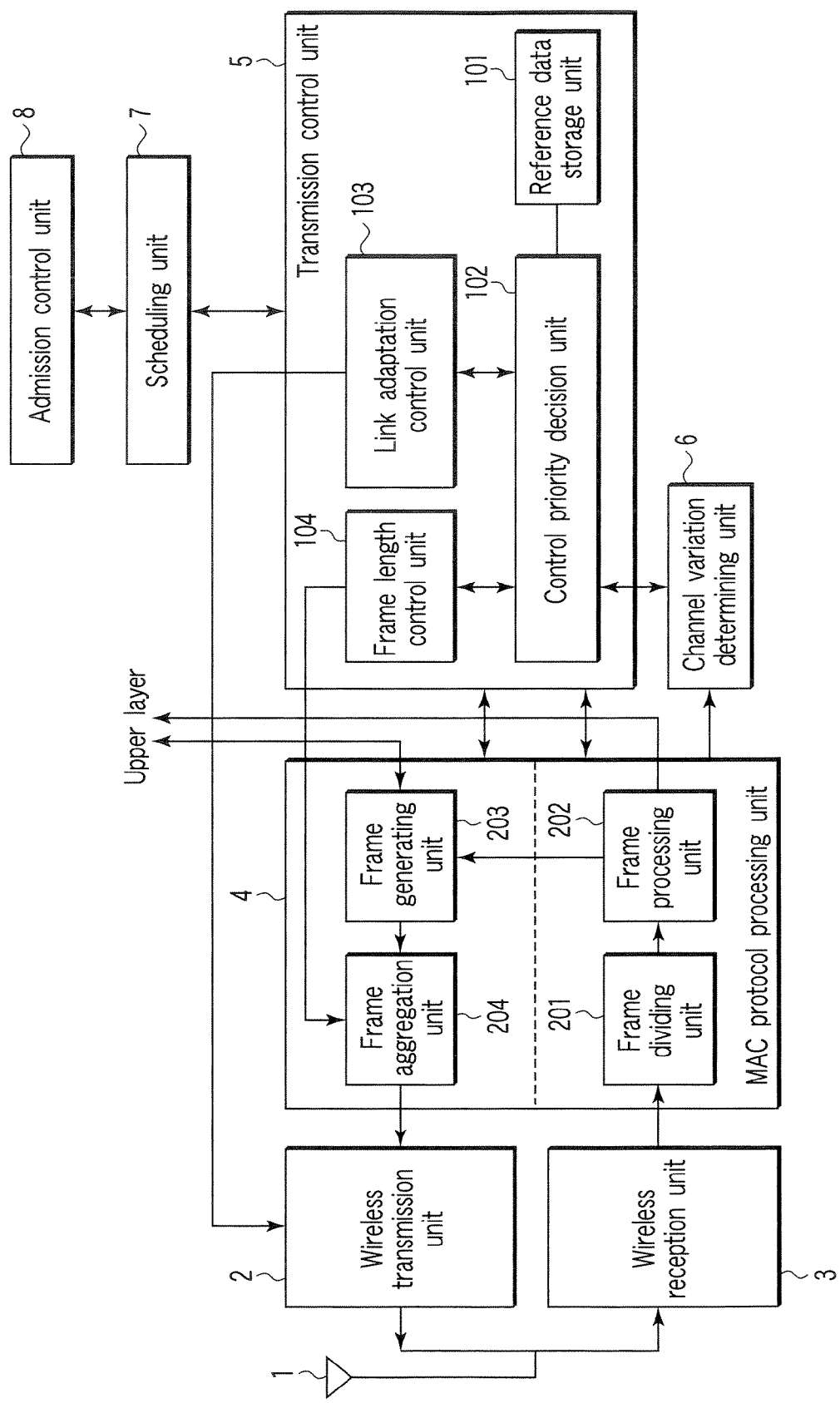
F I G. 1

| Transmission rate (Mb/s) | Threshold frame length (bytes) |
|---|---|
| 6.5—19.5 | 3*1024 |
| 26—52 | 4*1024 |
| 56.5—78 | 5*1024 |
| 104, 17 | 6*1024 |
| 130 | 7*1024 |

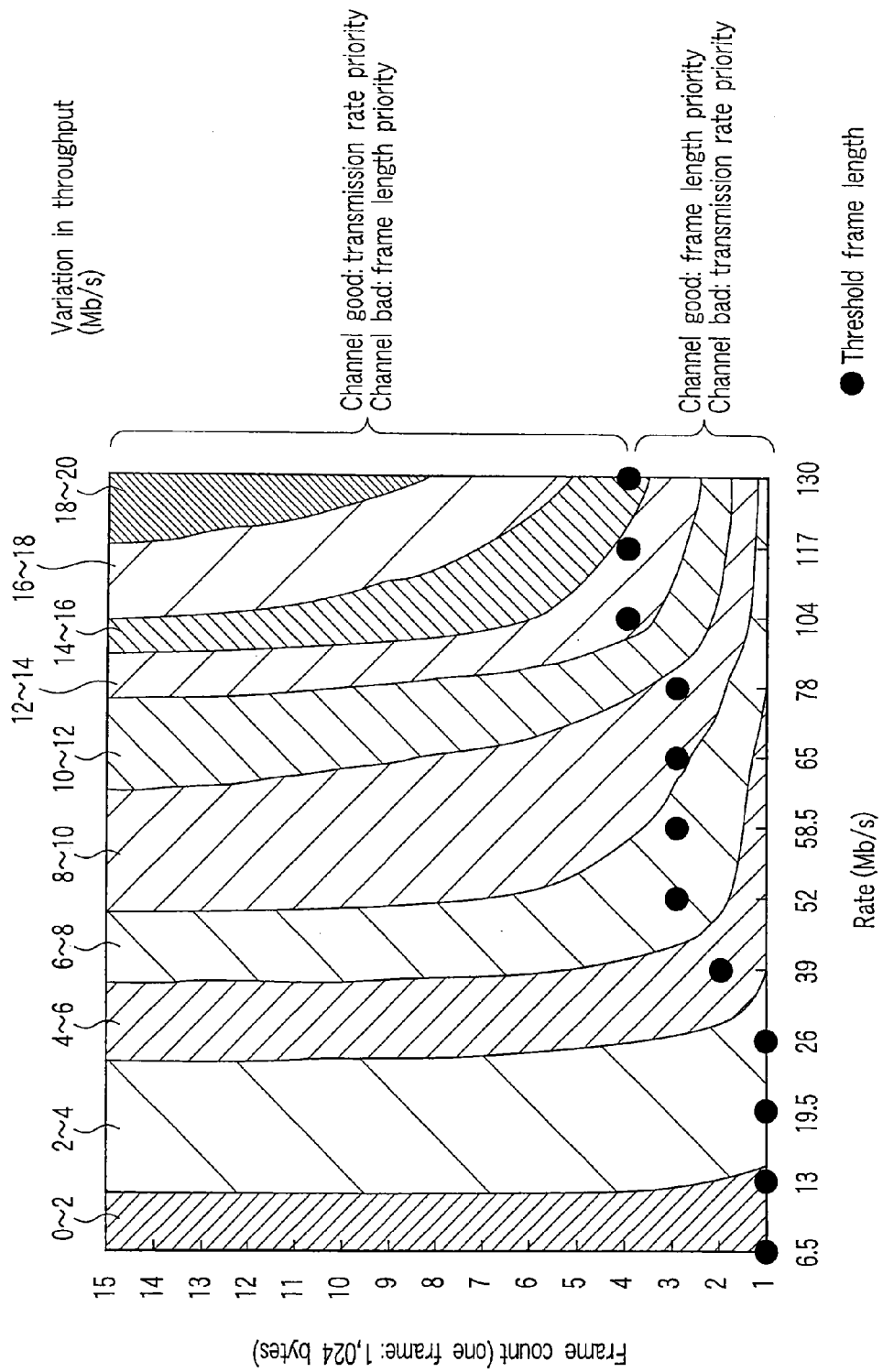
F I G. 5

| Transmission rate (Mb/s) | Threshold frame length (bytes) |
|---|---|
| 6.5−26 | 1*1024 |
| 39 | 2*1024 |
| 52−78 | 3*1024 |
| 104−130 | 4*1024 |

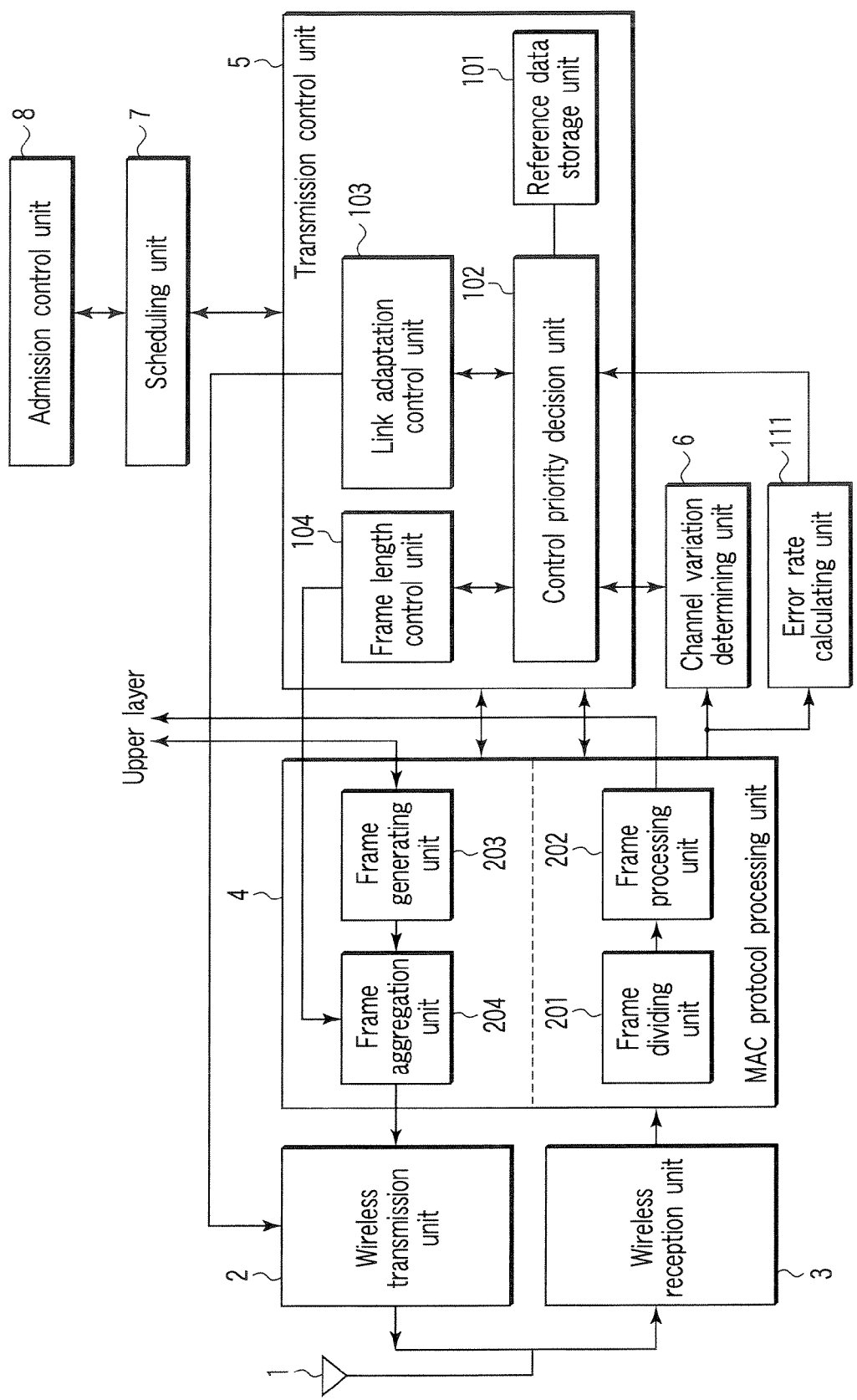
F I G. 11

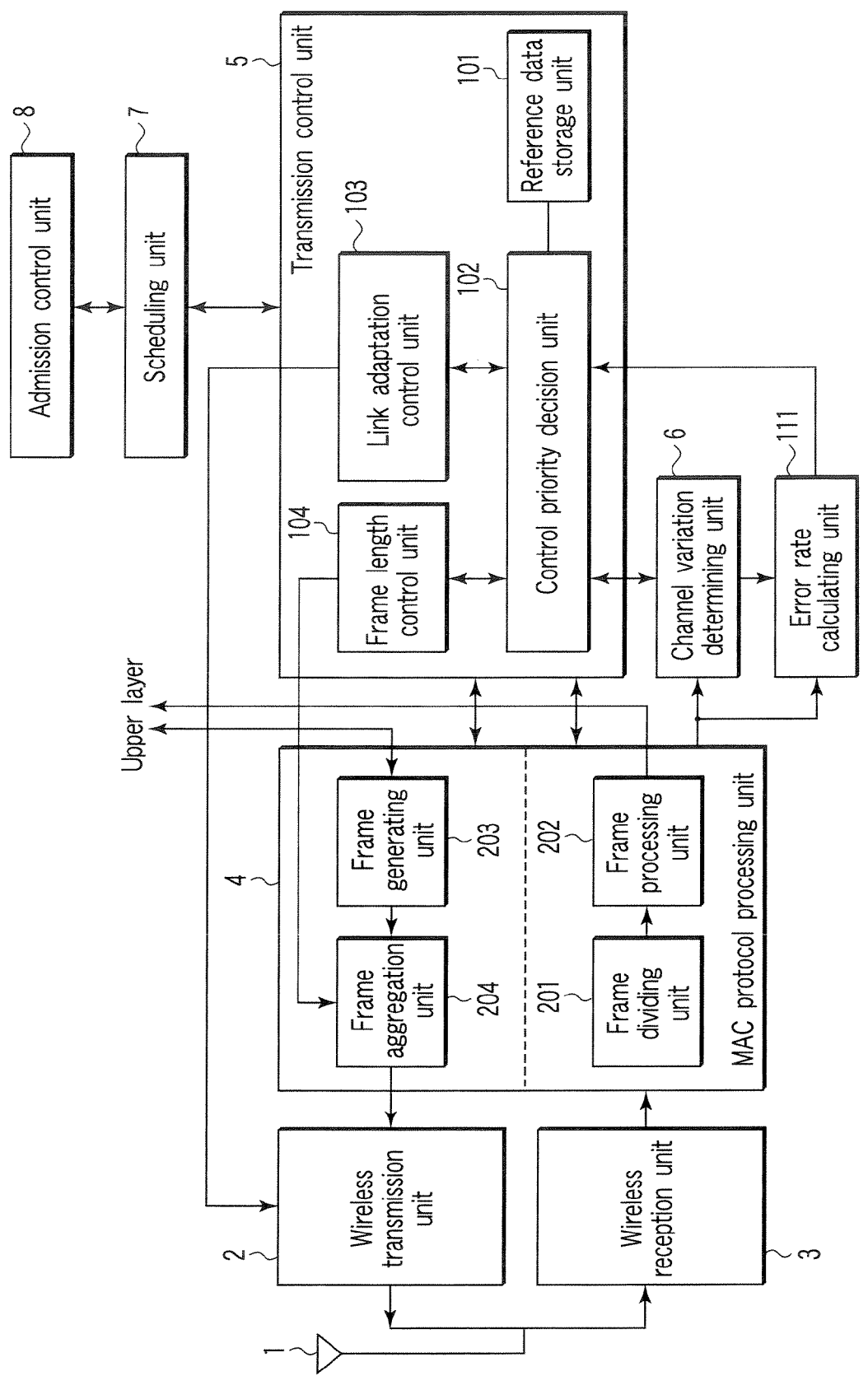
F I G. 13

WIRELESS COMMUNICATION APPARATUS AND TRANSMISSION CONTROL METHOD

CROSS-REFERENCE TO RELATED APPLICATIONS

This application is based upon and claims the benefit of priority from prior Japanese Patent Application No. 2006-150539, filed May 30, 2006, the entire contents of which are incorporated herein by reference.

BACKGROUND OF THE INVENTION

1. Field of the Invention

The present invention relates to a wireless communication apparatus.

2. Description of the Related Art

A wireless system uses a technique of transmitting a plurality of frames upon aggregating them to improve communication efficiency. For example, Task Group n (TGn), whose standardization has been under way via IEEE801.11, has proposed an aggregation technique of aggregating and transmitting a plurality of frames. This technique of aggregating and transmitting a plurality of frames can reduce overheads such as physical (PHY) and MAC layer headers accompanying each frame, which are required at the time of transmission and reception of frames, and the interval between frames.

On the other hand, as the frame length at the time of transmission and reception increases excessively, the wireless channel state estimated at the head of a frame differs from the state at the rear half portion of the frame, resulting in an error. That is, a proper frame length depends on the state of the wireless channel. There has therefore been proposed a mechanism of controlling the frame length in accordance with the state of the wireless channel by using this characteristic associated with the frame length (see JP-A 2004-260658 (KOKAI)).

For example, the technique in JP-A 2004-260658 (KOKAI) performs control to increase the frame length when the communication rate is low and the error rate is low, and to decrease the frame length when the communication rate is high and the error rate is high.

This technique also enumerates parameters associated with frame length control which decreases the frame length when the retransmission count is close to the maximum value and increases the frame length when the data occurrence frequency is low.

In an actual wireless environment, a transmission rate control, called link adaptation, is performed in accordance with the wireless environment. A conventional technique performs transmission rate control such as selecting a transmission rate with a packet error rate (PER) which satisfies a target error rate on the basis of the relationship between the PER and the target error rate.

When aggregating and transmitting a plurality of frames, as described above, since even the frame length at the time of transmission/reception is associated with the occurrence of errors, it is necessary to simultaneously consider transmission rate control and frame length control for frames to be aggregated. In this case, whether to control the transmission rate or the frame length cannot be determined only by a comparison between the PER of overall frames after aggregation and the target error rate.

If, for example, an error occurs due to the frame length after aggregation, conventional rate control is performed to change the transmission rate even in a wireless environment which requires no transmission rate control, resulting in a decrease in throughput. In contrast, even control on the frame length after frame aggregation in a wireless environment which requires rate control does not contribute to an improvement in error reduction, resulting in a decrease in throughput.

It is therefore ideal to select an optimal frame length and transmission rate by calculating a throughput from the frame length and transmission rate after the aggregation of a plurality of frames. Every time frame length control or transmission rate control is performed in accordance with whether the state of a wireless channel is good/bad, it is necessary to calculate and compare throughputs based on two or more combinations (frame lengths and transmission rates). When a transmission rate x and a frame length y are set and a wireless channel state is good, it is necessary to calculate throughputs with respect to at least combinations of "x and (y+1)" and "(x+1) and y". Furthermore, this calculation does not take into consideration error proneness in the rear half portion upon aggregation of a plurality of frames.

As a mechanism of giving consideration to error proneness in the rear half portion upon aggregation of a plurality of frames, it suffices to use a technique of holding a PER table corresponding to "selectable rate count (MCS count)×aggregation count×packet length" and select a proper frame aggregation count and transmission rate by referring to the table information. However, since the PER table changes according to the wireless environment, it is not realistic to hold PER tables in various wireless environments.

As described above, when aggregating and transmitting a plurality of frames, the conventional technique cannot easily perform control to increase/decrease the frame length and the transmission rate, in accordance with whether the wireless channel state is good/bad (the error rate of reception frames), on the basis of the throughput.

BRIEF SUMMARY OF THE INVENTION

According to embodiments of the present invention, a wireless communication apparatus includes:

a frame aggregation unit configured to generate an aggregated frame including a plurality of frames and having a frame length;

a transmission unit configured to transmit the aggregated frame at transmission rate of a plurality of transmission rates;

a memory to store, for each of the transmission rates, a threshold frame length defined between a first frame length range and a second frame length range, if the frame length is within the second frame length range not more than the threshold frame length, a throughput increase rate not less than a predetermined threshold value being obtained by increasing the frame length;

a selection unit configured to select, by comparing the threshold frame length at the transmission rate with the frame length, at least one of (a) another transmission rate of the transmission rates and (b) a new frame length of the aggregated frame;

a control unit configured to set the transmission rate to the selected another transmission rate if the another transmission rate is selected, and to set the frame length to the new frame length if the new frame length is selected.

BRIEF DESCRIPTION OF THE SEVERAL VIEWS OF THE DRAWING

FIG. 1 is a block diagram showing an example of the arrangement of a wireless communication apparatus according to the first embodiment;

FIG. 5 shows an example of throughput variation characteristics with respect to changes in transmission rate and frame length, and threshold frame lengths corresponding to the respective transmission rates according to the second embodiment;

FIG. 11 is a block diagram showing an example of the arrangement of a wireless communication apparatus according to the fifth embodiment;

FIG. 13 is a block diagram showing another example of the arrangement of the wireless communication apparatus according to the fifth embodiment.

DETAILED DESCRIPTION OF THE INVENTION

Figure 2:
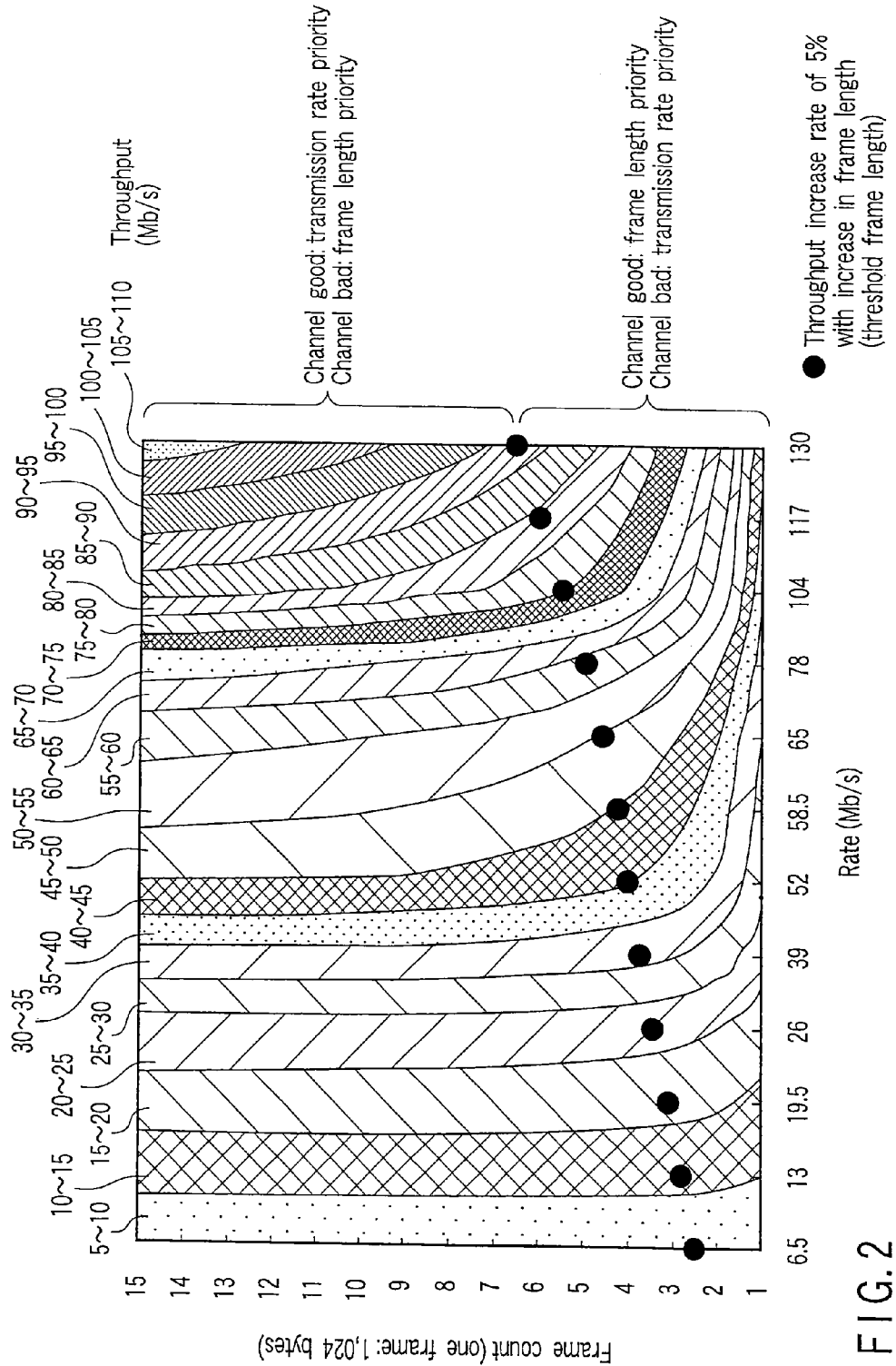
FIG. 2 shows an example of throughput characteristics with respect to transmission rates and the frame lengths of aggregated frames and threshold frame lengths with respect to the respective transmission rates.

The embodiments of the present invention will be described below with reference to the views of the accompanying drawing.

First Embodiment

The wireless communication apparatus in FIG. 1 includes at least an antenna 1, wireless transmission unit 2, wireless reception unit 3, MAC protocol processing unit 4, transmission control unit 5, channel variation determining unit 6, scheduling unit 7, and admission control unit 8.

The MAC protocol processing unit 4 includes a frame dividing unit 201, frame processing unit 202, frame generating unit 203, and frame aggregation unit 204. The transmission control unit 5 includes a reference data storage unit 101, control priority decision unit 102, link adaptation control unit 103, and frame length control unit 104.

The operation of the wireless communication apparatus in FIG. 1 at the time of transmission of a signal will be briefly described first.

The admission control unit 8 performs a procedure for inquiring whether to communicate with the communication apparatus, for example, notifying a desired communication apparatus such as an access point (AP) of the transmission rate which can be used. If the communication apparatus has an available channel and it is possible to communicate with the communication apparatus, the scheduling unit 7 performs a procedure for the assignment of an available channel or the like between the self-apparatus and the communication apparatus. When transmitting a frame to the communication apparatus after the above procedures, the frame generating unit 203 generates first a frame containing data output from the upper layer. On the basis of the frame length (or frame count) notified from the frame length control unit 104, the frame aggregation unit 204 generates an aggregated frame containing one or a plurality of frames by aggregating frames corresponding to the notified frame length/frame count. Note that in this case, the frame length of the aggregated frame is called an aggregation length, and the number of frames contained in the aggregated frame will be referred to as an aggregation count. The frame length control unit 104 notifies the frame aggregation unit 204 of the aggregation length/aggregation count.

The generated aggregated frame is output to the wireless transmission unit 2 upon a series of access control. The wireless transmission unit 2 transmits the input aggregated frame through the antenna 1 upon performing encoding processing, modulation processing, D/A conversion, frequency conversion to a predetermined frequency, and the like.

The operation of the wireless communication apparatus in FIG. 1 at the time of reception of a signal will be described. The wireless reception unit 3 performs frequency conversion to a baseband frequency, A/D conversion, and demodulation processing, decoding processing, and the like for the signal received through the antenna 1, and outputs the resultant reception data containing the aggregated frame to the MAC protocol processing unit 4. The frame dividing unit 201 of the MAC protocol processing unit 4 removes a header portion from the input reception data (aggregated frame) to extract a data portion. The frame processing unit 202 performs CRC check and retransmission processing by using the extracted data portion.

A reception frame is either a data frame transmitted from a communication partner of the wireless communication apparatus or a reception acknowledgement transmitted from the communication partner in response to the data frame transmitted from the wireless communication apparatus to the communication partner. For example, in a wireless LAN system, the reception side of a data frame transmits an acknowledgement such as an ACK or Block Ack to notify the transmission side of the success/failure of reception of the data frame. If the reception data is a data frame, the frame processing unit 202 outputs the payload in the data frame to the upper layer. If the reception data is an acknowledgement (e.g., an ACK/NAK with respect to each frame in the aggregated frame or a Block ACK for the overall aggregated frame) with respect to the previously transmitted data frame, the frame processing unit 202 performs retransmission processing on the basis of the acknowledgement, and notifies the channel variation determining unit 6 of this acknowledgement.

The channel variation determining unit 6 calculates the error rate of a plurality of frames as a whole (overall aggregated frame) in the reception data by using an ACK/NAK with respect to each frame in the aggregated frame or a Block ACK with respect to the overall aggregated frame obtained by the frame processing unit 202, and compares the calculated result with a predetermined target error rate, thereby determining whether the state of the wireless transmission path (wireless channel) is good. If, for example, the calculated error rate is less than the target error rate, the channel variation determining unit 6 determines that the wireless channel state is good. If the calculated error rate is equal to or more than the target error rate, the channel variation determining unit 6 determines that the wireless channel state is bad.

The error rate of the overall aggregated frame which is calculated by the channel variation determining unit 6 will be briefly described. Assume that an aggregated frame contains 10 frames. In this case, if ACKs are obtained with respect to all the 10 frames of the transmitted 10 frames, the error rate is 0%. If ACKs are obtained with respect to only six frames of the 10 frames, the error rate is 40%. In this manner, the error rate of an overall aggregated frame can be obtained as the ratio of the number of frames with respect to which an acknowledgement ACK cannot be obtained to the number of frames in the transmitted aggregated frame. In addition, when an aggregated frame containing 10 frames is transmitted a plurality of times, it suffices to use the average of the above error rates with respect to the respective aggregated frames. Furthermore, when an aggregated frame containing 10 frames is transmitted a plurality of times, the error rate of each frame in the aggregated frame can be obtained as the ratio of the number of times an acknowledgement ACK with respect to the frame cannot be obtained to the number of times the aggregated frame is transmitted. Therefore, the error rate of the aggregated frame may be the average of the error rates of the respective frames in the aggregated frame.

Note that the channel variation determining unit 6 may use a received signal strength indicator (RSSI) obtained by the wireless reception unit 3 at the time of reception of a signal or a channel estimation result, instead of the above error rate, for the determination of whether a wireless channel state is good/bad. For example, the channel variation determining unit 6 compares an RSSI or a channel estimation result with a predetermined threshold to determine whether a wireless channel state is good/bad. Alternatively, the channel variation determining unit 6 may determine the quality of a wireless channel state on the basis of the time required to receive an acknowledgement with respect to a data frame after it is transmitted or whether an acknowledgement is received within a predetermined period of time.

Assume that in this case, the channel variation determining unit 6 determines the quality of a wireless channel state by comparing an error rate calculated at the time of reception of a signal with a predetermined target error rate.

If the calculated error rate is lower than the target error rate (or is equal to or less than the target error rate), it is possible to maintain the current transmission rate and the frame length of the aggregated frame or increase at least the transmission rate or the frame length of the aggregated frame. If the calculated error rate is equal to more than the target error rate (or is higher than the target error rate), it indicates that the current transmission rate or the frame length of the aggregated frame is not appropriate, and it is necessary to reduce at least the transmission rate or the frame length of the aggregated frame.

When increasing or decreasing the transmission rate or the frame length of the aggregated frame, the control priority decision unit 102 decides which one of the transmission rate and the frame length of the aggregated frame is to be increased or decreased, by using reference data stored in the reference data storage unit (memory) 101.

The processing operation of the control priority decision unit 102 will be described next.

FIG. 2 shows 12 transmission rates (Mb/s) plotted along the abscissa, and 15 frame lengths of aggregated frames plotted along the ordinate, with each frame length being represented by the number of frames each of which is a fixed-length frame of 1,024 bytes. Note that the frame length is not limited to this, and may be expressed by a unit of 1,000 bytes.

As shown in FIG. 2, in general, with an increase in transmission rate or the frame length of an aggregated frame, the throughput increases. However, variations in throughput are not uniform; the throughput varies depending on conditions such as the transmission frame and the frame length (the frame count) of an aggregated frame.

When, for example, the transmission rate is 65 Mb/s and the frame count is "2", if the transmission rate is increased by one step to 78 Mb/s, the throughput difference falls within 5 Mb/s. It is, however, obvious that if the transmission rate is kept to 65 Mb/s, and the frame count is changed from "2" to "3", the throughput difference is 5 to 10 Mbps. Under this condition, therefore, the throughput is increased by a higher degree by increasing the frame count.

On the other hand, even if the transmission rate is 65 Mb/s, when the frame count is "8", a throughput difference of 10 to 15 Mbps is obtained by increasing the transmission by one step. However, even if the frame count is increased, the throughput difference is about 5 Mb/s. Under this condition, therefore, the throughput is increased by a higher degree by increasing the transmission rate.

As described above, the influence of an increase in frame length by one frame is influenced by the frame length of an aggregated frame before the increase. In brief, generally, when the frame length of an aggregated frame is small, increasing the frame length of an aggregated frame by one frame will improve the throughput to a great degree. If, however, the frame length of an aggregated frame is equal to or more than a given value, even increasing the frame length will not improve the throughput much.

By using such characteristics, a threshold is decided, which determines which one of the transmission rate or the frame count is to be controlled preferentially.

For example, with regard to each transmission rate, assume, as a reference threshold frame length, a frame length at the boundary between a frame length range in which the throughput increase rate becomes 5% or more as the frame length of an aggregated frame increases and a frame length range in which the throughput increase rate is less than 5% regardless of how much the frame length increases. Referring to FIG. 2, the bullets represent threshold frame lengths at the respective transmission rates.

That is, referring to FIG. 2, when the transmission rate is 52 Mb/s, the threshold frame length is a frame count of "4". Assume that a wireless channel state is good (e.g., the calculated error rate is less than a target error rate). In this case, when the number of frames in the aggregated frame is currently 1 to 3, a throughput increase rate of 5% or more can be obtained by increasing the frame length of the aggregated frame (e.g., by one frame). In contrast, when the wireless channel state is bad (e.g., the calculated error rate is equal to or more than a target error rate), in order to reduce the error rate below the target error rate, it is necessary to decrease the transmission rate or the frame length of the aggregated frame. In this case, in contrast, decreasing the transmission rate (e.g., decreasing the transmission rate by one step) makes it possible to further suppress a reduction in throughput. In addition, in a case wherein the number of frames in an aggregated frame is currently four or more, when the calculated error rate is lower than the target error rate, the throughput increase rate remains less than 5% no matter how much the frame length is increased. When increasing the transmission rate improves the throughput and the calculated error rate is equal to or more than the target error, decreasing the frame count makes it possible to improve the error rate and suppress a reduction in throughput.

As shown in, for example, FIG. 2, the reference data storage unit 101 stores throughput characteristics with respect to transmission rates and the frame lengths of aggregated frames and reference data representing threshold frame lengths determined with respect to the respective transmission rates.

Note that the reference data stored in the reference data storage unit 101 may contain at least a threshold frame length determined with respect to each transmission rate in FIG. 2.

In addition, it suffices to determine different threshold frame lengths for the respective transmission rates or to determine one threshold frame length for each set of a plurality of adjacent transmission rates.

Figures 3, 4:
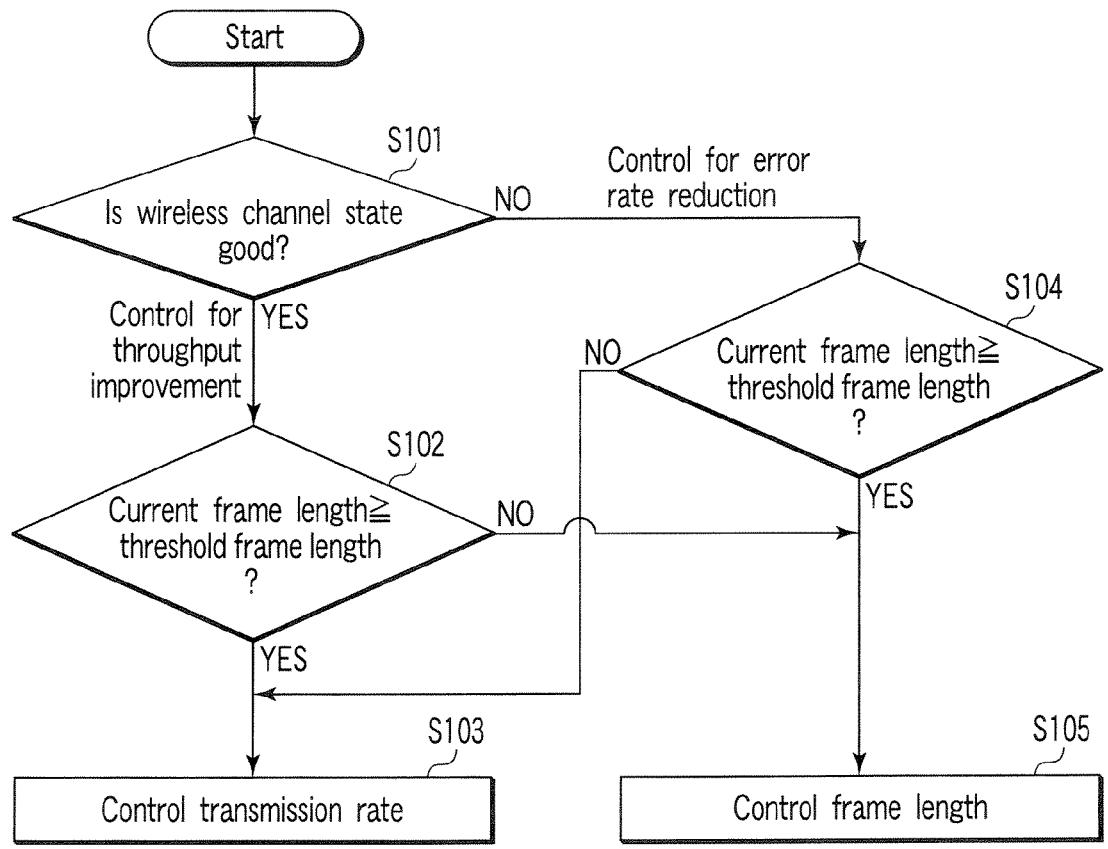
FIG. 3 is a table indicating the relationship between each transmission rate and a threshold frame length.
FIG. 4 is a flowchart showing the processing operation of a control priority decision unit.

The relationship between each transmission rate and the threshold frame length like that shown in FIG. 2 may be expressed by a table like that shown in FIG. 3. The reference data storage unit 101 stores a table like that shown in FIG. 3.

In addition, a threshold frame length is the frame length (unit is bit or byte) of an aggregated frame or the number of frames contained in an aggregated frame.

Consider, for example, a wireless communication apparatus (terminal) compatible with a plurality of applications and a terminal compatible with only one application. In the terminal compatible with only one application, one packet length (one frame length) of the application is uniquely determined. In this case, therefore, a threshold frame length is preferably expressed by a frame count. An access point (AP) of a wireless LAN accommodates a plurality of terminals, and the respective terminals are likely to handle different applications. In this case, a threshold frame length is preferably expressed by a frame length.

When the wireless channel state is good (the calculated error rate is lower than the target error rate), the control priority decision unit 102 compares a threshold frame length corresponding to the current transmission rate, which is obtained from, for example, the table in FIG. 3 stored in the reference data storage unit 101, with the frame length (frame count) of the current aggregated frame, and decides to increase the frame length if the current frame length is less than the threshold frame length. If the current frame length is equal to or more than the threshold frame length, the control priority decision unit 102 decides to increase the transmission rate. When the wireless channel state is bad (the calculated error rate is equal to or more than the target error rate), the control priority decision unit 102 decides to increase the transmission rate if the current frame length is less than the threshold frame length corresponding to the current transmission rate. If the current frame length is equal to or more than the threshold frame length, the control priority decision unit 102 decides to increase the frame length.

Referring to FIGS. 2 and 3, a threshold frame length is expressed by a frame count which makes a throughput increase rate become 5% as the frame length increases. However, the throughput increase rate is not limited to this, and may be a numerical value other than 5%.

The processing operation of the control priority decision unit 102 will be described with reference to a flowchart in FIG. 4.

If the channel variation determining unit 6 determines that the calculated error rate is lower than the target error rate, i.e., the wireless channel state is good (step S101), the throughput can be increased by increasing the transmission rate or the frame length. The process advances to step S102 to read out a threshold frame length corresponding to the current transmission frame from the table in FIG. 3. If the current frame length is equal to or more than the readout threshold frame length, the process advances to step S103 to select a control method of increasing the transmission rate above the current transmission rate. In this case, an instruction to increase the transmission rate is issued to the link adaptation control unit 103.

If the current frame length is less than the readout threshold frame length, the process advances to step S105 to select a control method of increasing the frame length of the aggregated frame above the current frame length. In this case, an instruction to increase the frame length is issued to the frame length control unit 104.

If the channel variation determining unit 6 determines that the calculated error rate is equal to or more than the target error rate, i.e., the wireless channel state is bad (step S101), it is necessary to decrease the transmission rate or the frame length in order to decrease the error rate below the target error rate. In this case, control is performed on one of the transmission rate and the frame length which more reduces the throughput.

The process advances to step S104 to read out a threshold frame length corresponding to the current transmission rate from the table in FIG. 3. If the current frame length is equal to or more than the readout threshold frame length, the process advances to step S105 to select a control method of decreasing the frame length of the aggregated frame. In this case, an instruction to decrease the frame length is sent to the frame length control unit 104 to improve the error rate. If the current frame length is less than the readout threshold frame length, the process advances to step S103 to select a control method of decreasing the transmission rate below the current transmission rate. In this case, an instruction to decrease the transmission rate is issued to the link adaptation control unit 103 to improve the error rate.

The frame length control unit 104 holds the current frame length and decides a new frame length on the basis of the current frame length (the frame count in this case) and an instruction from the control priority decision unit 102. That is, an instruction to increase the frame length is input from the control priority decision unit 102, a predetermined length (e.g., one frame or a predetermined number of bits or bytes) is added to the current frame length to decide a new frame length. If an instruction to decrease the frame length is input from the control priority decision unit 102, a predetermined length (e.g., one frame or a predetermined number of bits or bytes) is subtracted from the current frame length to decide a new frame length. The frame aggregation unit 204 is notified of the decided new frame length. That is, The frame aggregation unit 204 is set the new frame length by the frame length control unit 104.

The frame aggregation unit 204 aggregates the MAC frames generated by the frame generating unit 203 in accordance with the notified frame length, and outputs the aggregated frame to the wireless transmission unit 2.

The link adaptation control unit 103 stores in advance a table indicating a plurality of transmission rates and modulation schemes and error correction encoding schemes which are determined in advance with respect to the respective transmission rates. The link adaptation control unit 103 holds the current transmission rate of the plurality of transmission rates in the table, and decides a new transmission rate on the basis of the current transmission rate and an instruction from the control priority decision unit 102. Upon receiving an instruction to increase the transmission rate from the control priority decision unit 102, the link adaptation control unit 103 decides an available transmission rate higher than the current transmission rate (e.g., a transmission rate higher by one step) as a new transmission rate. Upon receiving an instruction to decrease the transmission rate from the control priority decision unit 102, the link adaptation control unit 103 decides an available transmission rate lower than the current transmission rate (e.g., a transmission rate higher by one step) as a new transmission rate. The link adaptation control unit 103 reads out a modulation scheme and error correction encoding scheme corresponding to this new transmission rate from the table and notifies the wireless transmission unit 2 of the new transmission rate, modulation scheme, and error correction scheme. That is, the wireless transmission unit 2 is set the new transmission rate, the modulation scheme, and the error correction scheme by the link adaptation control unit 103. This operation corresponds to conventional link adaptation control.

The wireless transmission unit 2 encodes and modulates the data of the (aggregated) frame input to the wireless transmission unit 2 in accordance with the modulation scheme and error correction scheme notified from the link adaptation control unit 103.

Assume that an error rate calculated with respect to a received frame is less than the target error rate. In this case, as described above, if the frame length of the current aggregated frame is less than the threshold frame length corresponding to the current transmission rate, the frame length is increased. If the frame length is equal to or more than the threshold frame length, the transmission rate is increased. This operation can efficiently improve the throughput. In contrast, assume that the error rate calculated with respect to the received frame is equal to or more than the target error rate. In this case, if the frame length of the current aggregated frame is less than the threshold frame length corresponding to the current transmission rate, the transmission rate is decreased to improve the error rate. If the frame length is equal to or more than the threshold frame length, the frame length is decreased to improve the error rate. This makes it possible to minimize a reduction in throughput accompanying decreases in transmission rate and frame length.

Note that the information of the current transmission rate and current frame length used for processing operation by the control priority decision unit 102 are obtained from the wireless transmission unit 2 and the MAC protocol processing unit 4. Alternatively, it suffices to feed back, to the control priority decision unit 102, the frame length and transmission rate decided by the link adaptation control unit 103 in accordance with instructions from the control priority decision unit 102.

Second Embodiment

The first embodiment has exemplified the case wherein with regard to each transmission rate, a threshold frame length is a frame length at the boundary between a frame length range in which the throughput increase rate becomes 5% or more as the frame length of an aggregated frame increases and a frame length range in which the throughput increase rate is less than 5% regardless of how much the frame length increases.

The second embodiment will exemplify another kind of threshold frame length.

Like FIG. 2, FIG. 5 shows 12 transmission rates (Mb/s) plotted along the abscissa, and 15 frame lengths plotted along the ordinate. As in the case shown in FIG. 2, a frame length is represented by the number of frames each of which is a fixed-length frame of 1,024 bytes. Note that the frame length is not limited to this, and may be expressed by a unit of 1,000 bytes.

FIG. 5 shows a throughput corresponding to a transmission rate of 6.5 Mbps and a frame length of 1,024 bytes as a reference, and other throughputs as values obtained by normalization with the above throughput as a reference. That is, a larger numerical value indicates a larger increase rate with respect to the reference throughput. Note that the above reference value is an example, and hence no problem arises even if a throughput corresponding to another case is used as a reference.

With regard to each transmission rate, a throughput increase rate obtained when the frame length of an aggregated frame increases is compared with a throughput increase rate obtained when the transmission rate increases. Assume, as a threshold frame length, a frame length at the boundary between the range of the frame lengths of aggregated frames in which the throughput increase rate in the former case is higher than the throughput increase rate in the latter case and the range of the frame lengths of aggregated frames in which the throughput increase rate in the latter case is higher than the throughput increase rate in the former case. Referring to FIG. 5, the bullets represent threshold frame lengths at the respective transmission rates.

That is, referring to FIG. 5, when the transmission rate is 52 Mb/s, the threshold frame length is "3". Assume that a wireless channel state is good (e.g., the calculated error rate is less than a target error rate). In this case, when the frame count of the aggregated frame is currently 1 to 3, increasing the frame length (e.g., by one frame) makes it possible to obtain a higher throughput increase rate than increasing the transmission rate. If the wireless channel state is bad (e.g., the calculated error rate is equal to or more than the target error rate), it is necessary to decrease the transmission rate or the frame length in order to reduce the error rate. In this case, decreasing the transmission rate (e.g., decreasing the transmission rate by one step) makes it possible to more suppress a reduction in throughput than decreasing the frame length of the aggregated frame.

Assume that the frame count of an aggregated frame is currently four or more. In this case, if the calculated error rate is lower than the target error rate, a higher throughput increase rate can be obtained by increasing the transmission rate than by increasing the frame length. If the calculated error rate is equal to or more than the target error rate, decreasing the frame length of the aggregated frame makes it possible to further improve the error rate and suppress a reduction in throughput than by decreasing the transmission rate.

As in the first embodiment, a reference data storage unit 101 stores in advance, for example, throughput characteristics corresponding to transmission rates and the frame lengths of aggregated frames, and reference data indicating threshold frame lengths determined for the respective transmission rates, as shown in FIG. 5.

Note that the reference data stored in the reference data storage unit 101 may contain at least threshold frame lengths determined for the respective transmission rates in FIG. 5.

In addition, it suffices to determine different threshold frame lengths for the respective transmission rates or to determine one threshold frame length for each set of a plurality of adjacent transmission rates.

Figures 6, 7:
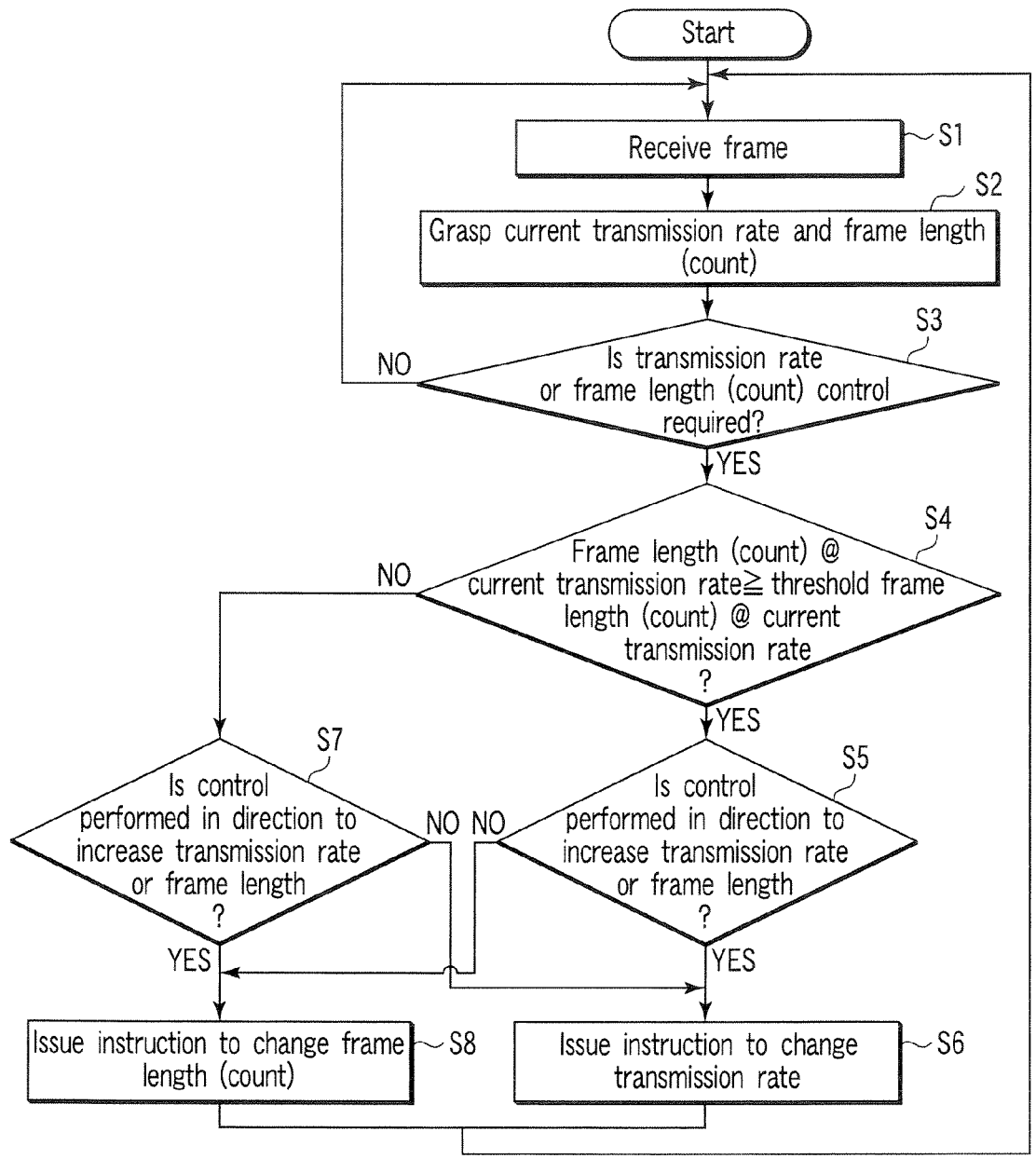
FIG. 6 is a table indicating the relationship between each transmission rate and a threshold frame length.
FIG. 7 is a flowchart for explaining specific processing operation for controlling a frame length and a transmission rate according to the third embodiment.

The relationship between each transmission rate and the threshold frame length like that shown in FIG. 5 may be expressed by a table like that shown in FIG. 6. The reference data storage unit 101 stores a table like that shown in FIG. 6.

As in the first embodiment (the flowchart of FIG. 4), when the wireless channel state is good (the calculated error rate is lower than the target error rate), a control priority decision unit 102 refers to the table in FIG. 6 stored in the reference data storage unit 101 to compare a threshold frame length corresponding to the current transmission rate with the frame length (frame count) of the current aggregated frame. If the current frame length is less than the threshold frame length, the control priority decision unit 102 selects a control method of increasing the frame length. If the current frame length is equal to or more than the threshold frame length, the control priority decision unit 102 selects a control method of increasing the transmission rate. When the wireless channel state is bad (the calculated error rate is equal to or more than the target error rate), the control priority decision unit 102 selects a control method of increasing the transmission rate if the current frame length is less than the threshold frame length corresponding to the current transmission rate. If the current frame length is equal to or more than the threshold frame length, the control priority decision unit 102 selects a control method of increasing the frame length.

Note that the threshold frame length may be a constant value with respect to all transmission rates without depending on transmission rates as in the above case. Note that the combinations of the transmission rates and the frame lengths in the first and second embodiments are an example, and no problem arises even if other values are used.

Third Embodiment

The first and second embodiments have exemplified the threshold frame lengths and the basic operation of the control priority decision unit 102.

The processing operation which is performed by the wireless communication apparatus in FIG. 1 to control a frame length and a transmission rate will be described in detail with reference to the flowchart shown in FIG. 7.

When the wireless communication apparatus in FIG. 1 receives an aggregated frame transmitted from a wireless communication apparatus as a communication partner in the above manner (step S1), a control priority decision unit 102 obtains the current transmission rate and frame length from a wireless transmission unit 2 and a MAC protocol processing unit 4. Alternatively, the control priority decision unit 102 receives the frame length and transmission rate which a frame length control unit 104 and a link adaptation control unit 103 respectively decided in accordance with instructions from the control priority decision unit 102. As a result, when receiving an aggregated frame in step S1, the control priority decision unit 102 can obtain the current transmission rate and frame length (step S2).

For example, the current transmission rate is 26 Mb/s, and the frame count (length) of the aggregated frame is "2" (2,048 bytes). Assume that at this time, a channel variation determining unit 6 determines that the wireless channel state is good (step S3). In this case, the control priority decision unit 102 selects one of the transmission rate control method and the frame length control method which can increase the throughput to a higher degree, as described in, for example, the first and second embodiments. That is, the control priority decision unit 102 refers to the table in FIG. 3 or 6 to select a control method of increasing the frame length (because the current frame length is shorter than the threshold frame length corresponding to the current transmission rate) (steps S4, S7, and S8). The control priority decision unit 102 then outputs an instruction to increase the frame length of the aggregated frame by, for example, one frame to the frame length control unit 104 (step S8).

When the next aggregated frame is received, the current transmission rate is 26 Mb/s, which is the same as that in the previous operation, but the current frame count (length) is "3" (3,072 bytes). Assume that at this time, the channel variation determining unit 6 determines that the wireless channel state is good (step S3). As in the above case, the control priority decision unit 102 refers to the table shown in FIG. 3 or 6 to select a control method of increasing the frame length again (because the current frame length is shorter than the threshold frame length corresponding to the current transmission rate) (steps S4, S7, and S8). The control priority decision unit 102 then outputs an instruction to increase the frame length of the aggregated frame by, for example, one frame to the frame length control unit 104 (step S8).

When the next aggregated frame is received, the current transmission rate is 26 Mb/s which is the same as that in the previous operation, but the current frame count (length) is "4" (4,096 bytes) which is equal to or more than the threshold frame length. Assume that at this time, the channel variation determining unit 6 determines that the wireless channel state is good (step S3). The control priority decision unit 102 refers to the table shown in FIG. 3 or 6 to select a control method of increasing the transmission rate this time (because the current frame length is equal to or more than the threshold frame length corresponding to the current transmission rate) (steps S4, S5, and S6). The control priority decision unit 102 then outputs an instruction to increase the transmission rate by, for example, one step to the link adaptation control unit 103 (step S6). Thereafter, the transmission rate is 39 Mb/s, and the frame count is "4".

When the next aggregated frame is received and the wireless channel state is good, the transmission rate is increased subsequently until the transmission rate becomes 58.5 Mb/s (steps S1 to S6). When the transmission rate becomes 58 Mb/s (the threshold frame length corresponding to this transmission rate is "5"), the number of frames contained in the received aggregated frame becomes smaller than the threshold frame count again. In this case, the process advances from step S4 to step S7 and step S8, in which the control priority decision unit 102 outputs an instruction to increase the frame length to the frame length control unit 104.

The above description has exemplified the case wherein the frame count (length) or the transmission frame is increased or decreased frame by frame/step by step. However, the degree by which the frame count (length) or the transmission rate is increased or decreased is not limited to one frame or one step.

Fourth Embodiment

The data occurrence frequency may vary and have a burst characteristic on the upper layer depending on the application operating on the wireless communication apparatus in FIG. 1.

For example, a constant bit rate (CBR) encoding scheme and a variable bit rate (VBR) encoding scheme are available as encoding schemes used to convert sound and video into data. When a constant bit rate is set, the upper layer always outputs data at a constant rate. In this case, it can be expected how much data will be stored in a transmission buffer (mounted in a frame generating unit 203) within a delay limit. This predictive value is the upper limit of frame lengths (counts) in frame length control by the frame length control unit 104 described above.

In the case of a variable bit rate, the amount of data output from the upper layer varies depending on, for example, the intensity of the movement/change of video. In this case, prediction cannot be performed in the same manner as in the case of a constant bit rate. For this reason, the amount of data stored in the transmission buffer may be smaller than the frame length (frame count) decided by the frame length control unit 104 in accordance with an instruction from a control priority decision unit 102, as described in the first to third embodiments.

In addition, if the data occurrence frequency on the upper layer is not constant, data which are frequently output may considerably drop in occurrence frequency at a given moment. In such a case, the frame length (count) stored in the transmission buffer may be preferably transmitted once. In spite of this, as described in the first to third embodiments, when the frame length control unit 104 increases the frame length (frame count) in accordance with an instruction from the control priority decision unit 102, data are not stored to the frame length (count). That is, there is no point in increasing the frame length (count). Furthermore, not increasing the frame length (count) enables transmitting data at a higher transmission rate with a smaller frame count.

As described in the first to third embodiments, even if the frame length is increased to improve the throughput, data output from the upper layer until the wireless communication apparatus acquires the next transmission right may not be stored to the amount of the frame length.

A transmission control method for inhibiting the frame length from being unnecessarily increased in consideration of such a case will be described with reference to the flowcharts of FIGS. 1 and 8. Obviously, this transmission control method is implemented as one of the functions included in the wireless communication terminal in FIG. 1 which has been described in the first to third embodiments.

The frame generating unit 203 counts the data amount of transmission data output from the upper layer and stored in the transmission buffer until the next transmission, or the number of transmission frames generated from the transmission data stored in the transmission buffer (step S201). The frame generating unit 203 then notifies the control priority decision unit 102 of the counted data amount of transmission data or the counted number of transmission frames.

As described above, the control priority decision unit 102 is notified of the current transmission rate and frame length. Upon selecting a control method of increasing the frame length of an aggregated frame (in, for example, the processing in steps S101, S102, and S105 in FIG. 4) to improve the throughput, the control priority decision unit 102 compares the amount of data that can be transmitted with the current frame length or the current frame count with the data amount of transmission data stored in the transmission buffer or the transmission frame count notified from the frame generating unit 203 (step S202).

If the data amount of transmission data stored in the transmission buffer or the transmission frame count is smaller than (or equal to or less than) the amount of data which can be transmitted with the current frame length or the current frame count, the control priority decision unit 102 selects a control method of increasing the transmission rate instead of the frame length. The control priority decision unit 102 then issues an instruction to increase the transmission rate to a link adaptation control unit 103. If the data amount of transmission data stored in the transmission buffer or the transmission frame count is equal to or more than (or larger than) the amount of data which can be transmitted with the current frame length or the current frame count, the control priority decision unit 102 issues an instruction to increase the frame length to the frame length control unit 104 (step S204).

Figure 9:
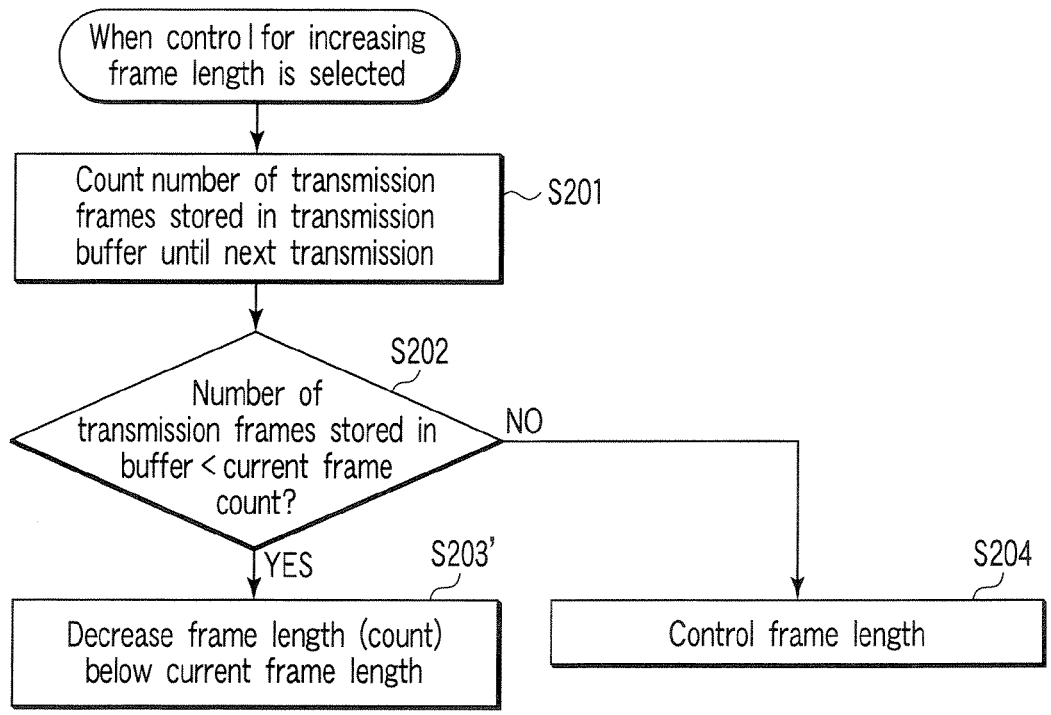
FIG. 9 is a flowchart for explaining another transmission control method according to the fourth embodiment configured to prevent the frame length from unnecessarily increasing.

As shown in FIG. 9, if the data amount of transmission data stored in the transmission buffer or the transmission frame count is smaller than the amount of data which can be transmitted with the current frame length or the current frame count (step S202), the process may advance to step S203' to issue, to the frame length control unit 104, an instruction to decrease the frame length of the aggregated frame to a frame length smaller than the current frame length by one step.

In addition, if the data amount of transmission data stored in the transmission buffer or the transmission frame count is smaller than the amount of data which can be transmitted with the current frame length or the current frame count (step S202), the control priority decision unit 102 may issue, to the frame length control unit 104, an instruction to decrease the frame length of the aggregated frame to a frame length smaller than the current frame length by, for example, one step, and may issue an instruction to increase the transmission rate to the link adaptation control unit 103.

If the occurrence frequency of transmission data is constant, the data amount or frame count of transmission data stored in the transmission buffer becomes constant. In this case as well, it suffices to set the upper limit of frame lengths (frame counts) of aggregated frames to the data amount or frame count of transmission data stored in the transmission buffer and control the frame length or frame count of an aggregated frame so as to prevent it from exceeding the upper limit, as in the case shown in FIGS. 8 and 9.

Figure 8:
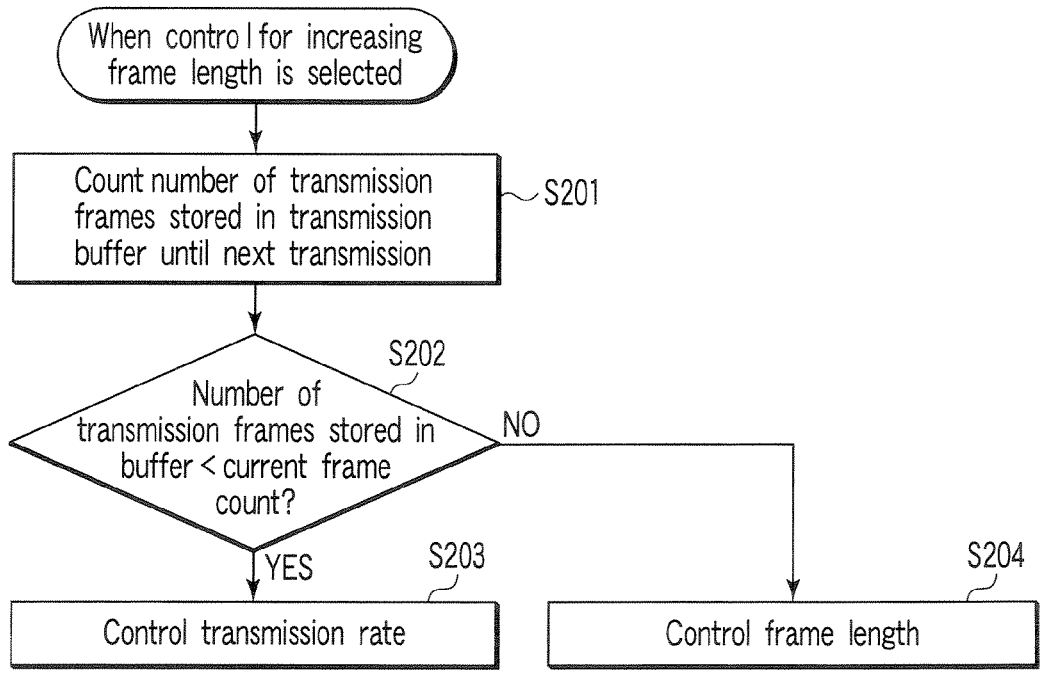
FIG. 8 is a flowchart for explaining a transmission control method according to the fourth embodiment configured to prevent the frame length from unnecessarily increasing.

As shown in FIG. 8, if the data amount or frame count of transmission data stored in the transmission buffer is smaller (or equal to or less than) the amount of data which can be transmitted with the current frame length or the current frame count (step S202), the control priority decision unit 102 issues an instruction to increase the transmission rate to the link adaptation control unit 103 (step S203). Alternatively, as shown in FIG. 9, the control priority decision unit 102 issues an instruction to decrease the frame length below the current frame length to the frame length control unit 104 (step S203). Alternatively, the control priority decision unit 102 issues, to the frame length control unit 104, an instruction to decrease the frame length of the aggregated frame to a frame length smaller than the current frame length by one step, and also issues an instruction to increase the transmission rate to the link adaptation control unit 103.

In this manner, whether the occurrence frequency of transmission data is constant or exhibits a burst characteristic, the throughput can be further improved by controlling the upper limit of frame lengths (frame counts) of aggregated frames so as to prevent the frame count of an aggregated frame from unnecessarily increasing, or more preferably, to make the amount of data which is transmitted with an aggregated frame fall within the amount of data stored in the transmission buffer. If the occurrence frequency of transmission data exhibits a burst characteristic, in particular, the technique exemplified by the fourth embodiment is effective.

Note that the above technique can be used for a case wherein window control is performed by using TCP/IP and the size of data which can be transmitted at once is limited by a congestion window.

Fifth Embodiment

The fifth embodiment newly includes a rate control error rate calculating unit.

The first to fourth embodiments have exemplified the method of selecting, in consideration of throughput, one of the method of controlling the frame length of an aggregated frame and the method of controlling a transmission rate which achieves a higher throughput.

In an actual wireless environment, since errors occur in transmission frames depending on a wireless channel state, the prior art controls a transmission rate by using an index such as the PER (Packet Error Rate) of an overall frame so as to make the error rate satisfy the target error rate. In addition, when an aggregated frame obtained by aggregating a plurality of frames is to be transmitted (the frame length (frame count) of the overall aggregated frame is large), the channel state of the rear half portion of the aggregated frame may differ from the value obtained by performing channel estimation at the head of the aggregated frame, and the error rate of the rear half portion of the aggregated frame may become higher (the number of errors may become larger) than that at the head of the aggregated frame. That is, the frame length at the time of transmission/reception also affects the error rate.

For example, as the error rate increases after the transmission rate is changed (increased), no improvement may be made even by decreasing the frame length. However, even obtaining the PER of an overall aggregated frame does not allow to determine whether the cause resides in the transmission rate or the frame length. Therefore, it cannot be determined whether to control the transmission rate or the frame length.

Figure 10:
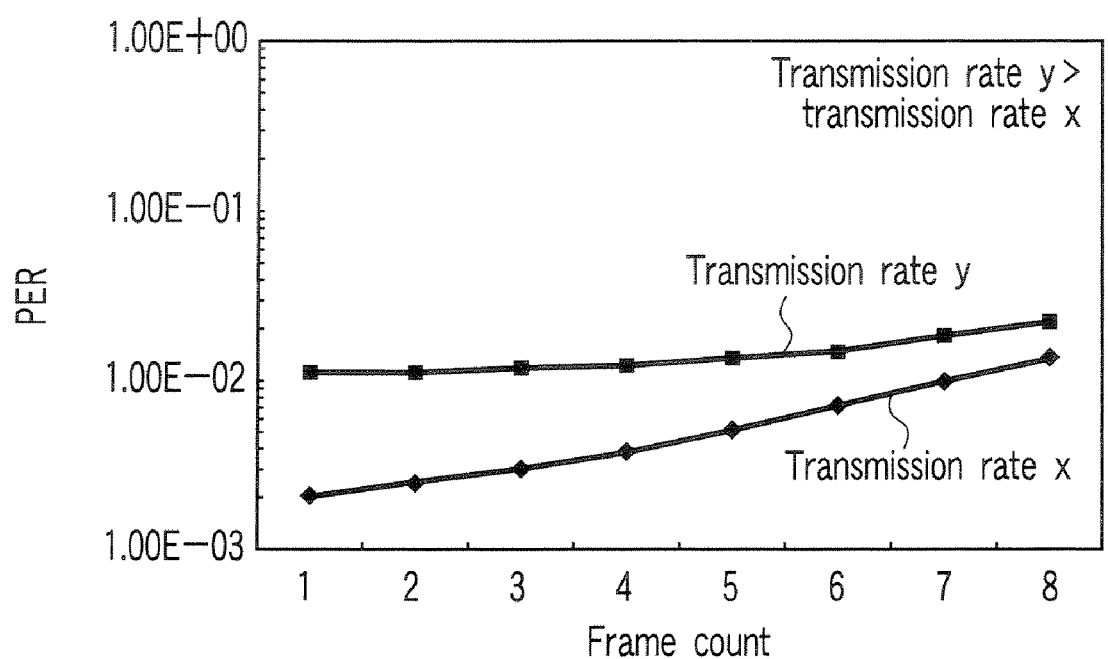
FIG. 10 shows the relationship between transmission rates and error rates.

Such a situation will be described with reference to FIG. 10. Assume that a transmission rate x is 78 Mb/s, and a transmission rate y is 104 Mb/s. Assume also that the target error rate is 1%.

According to the first to fourth embodiments, referring to FIG. 2, when an aggregated frame with a frame count of "7" is transmitted at the transmission rate x (78 Mb/s) and the error rate is less (or equal to or less) than the target error rate, the transmission mode is switched to a mode with the transmission rate y (104 Mb/s) and a frame count of "7" to preferentially control the transmission rate. After this switching operation, since the error rate exceeds the target error rate, the frame length is decreased. As is obvious from FIG. 10, the essential cause of errors is that the transmission rate is inappropriate, and hence reducing the frame length will produce little effect on the improvement of the error rate. In this case, it is preferable to restore the transmission rate to its initial value. Such a situation cannot be determined from the PER of the overall aggregated frame.

In addition to a channel variation determining unit 6, which compares the PER of an overall aggregated frame with a target error rate, the arrangement of the wireless communication apparatus in FIG. 1 newly includes a rate control error rate calculating unit 111, as shown in FIG. 11. The rate control error rate calculating unit 111 calculates a PER for rate control, and compares the PER with a target error rate to determine whether the current transmission rate is appropriate or inappropriate. The rate control error rate calculating unit 111 then notifies a control priority decision unit 102 of the determination result.

If the rate control error rate calculating unit 111 determines that the current transmission rate is not appropriate, the control priority decision unit 102 immediately outputs an instruction to decrease the transmission rate to a link adaptation control unit 103.

The rate control error rate calculating unit 111 may use one of the following methods as a method of calculating an error rate for rate control:
(1) a method of dividing an aggregated frame (for example, at the center) into front and rear half portions and calculating the error rate of frames in only the front half portion;
(2) a method of calculating an error rate from the head of an aggregated frame up to the frame length of a threshold frame; and
(3) a method of dividing an aggregated frame into front and rear half portions, obtaining error rates of the front and rear half portions, and calculating the error rate of the overall aggregated frame upon assigning a weight to the error rate of the front half portion. In this case, it suffices to divide an aggregated frame at the center into front and rear half portions or to regard, as a front half portion, the portion from the head of the aggregated frame to the threshold frame length, while regarding the remaining portion as a rear half portion.

The error rate of the front half portion (rear half portion) of an aggregated frame (used as an error rate for the above rate control) will be briefly described. Assume that an aggregated frame contains 10 frames. In this case, if ACKs are obtained with respect to all the five frames of the front rear portion (rear half portion) of the transmitted 10 frames, the error rate is 0%. If ACKs are obtained with respect to only three frames of the five frames of the front half portion (rear half portion), the error rate is 40%. In this manner, the error rate of the front half portion (rear half portion) can be obtained as the ratio of the frame count with respect to which no acknowledgement ACK can be obtained to the frame count of the front half portion (rear half portion) in the transmitted aggregated frame. In addition, when an aggregated frame containing 10 frames is transmitted a plurality of times, the error rate of each frame in the aggregated frame can be obtained as the ratio of the number of times an acknowledgement ACK with respect to the frame cannot be obtained to the number of times the aggregated frame is transmitted. Therefore, the error rate of the front half portion (rear half portion) of the aggregated frame may be the average of the error rates of the respective frames in the front half portion (rear half portion).

Specific processing operation for controlling a frame length or transmission rate in the wireless communication apparatus in FIG. 11 will be described next with reference to the flowchart shown in FIG. 12. Note that the same reference numerals as in FIG. 12 denote the same parts in FIG. 7.

As described above, the wireless communication apparatus in FIG. 11 receives an aggregated frame transmitted from a wireless communication apparatus as a communication partner (step S1). The control priority decision unit 102 obtains the current transmission rate and frame length (step S2).

The channel variation determining unit 6 then determines whether the wireless channel state is good/bad, and control on the transmission rate/frame length starts (step S3).

The rate control error rate calculating unit 111 calculates an error rate for rate control by using any one of methods (1) to (3) described above (step S301). The rate control error rate calculating unit 111 compares the calculated rate control error rate with the first threshold which is determined in advance with respect to error rates for rate control, and notifies the control priority decision unit 102 of the comparison result (step S302). If the calculated error rate is lower than the first threshold (step S302), since the current transmission rate is appropriate, the process advances to step S4. The processing operation in step S4 and the subsequent steps is the same as that in FIG. 7.

If it is determined in step S302 that the calculated error is equal to more than the first threshold, the cause is likely to be the high transmission rate. The process therefore advances to step S303, in which the control priority decision unit 102 outputs an instruction to decrease the transmission rate to the link adaptation control unit 103.

Figure 12:
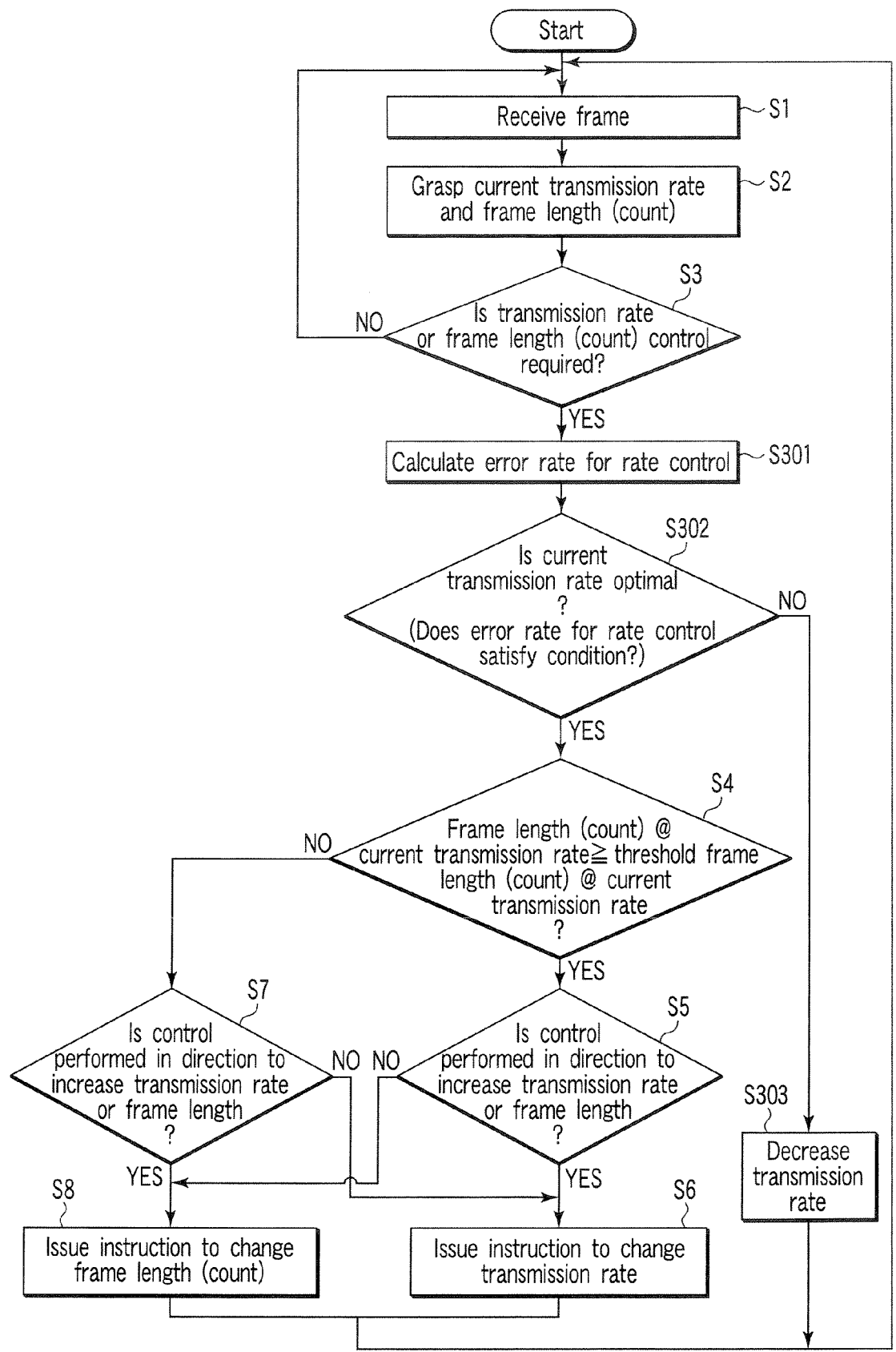
FIG. 12 is a flowchart for explaining a transmission control method according to the wireless communication apparatus in FIG. 11.

FIGS. 11 and 12 show a case wherein an error rate for rate control is calculated every time an aggregated frame is received.

The following case will be described below. That is, the channel variation determining unit 6 compares the error rate calculated at the time of reception of the signal (the error rate of the overall aggregated frame) with the target error rate to determine whether the wireless channel is good/bad. The channel variation determining unit 6 also compares the calculated error rate with the second threshold which is determined in advance with respect to the calculated error rate. If the calculated error rate is higher (or equal to more) than the second threshold, the rate control error rate calculating unit 111 calculates an error rate for rate control.

The arrangement shown in FIG. 13 differs from that shown in FIG. 11 in that the channel variation determining unit 6 compares an error rate calculated at the time of reception of a signal with the second threshold, and issues an instruction to calculate an error rate for rate control to the rate control error rate calculating unit 111 if the calculated error rate is larger (equal to or larger) than the second threshold (i.e., the error rate of the aggregated frame is bad to some degree).

Note that the error rate which is calculated at the time of reception of a signal after the control priority decision unit 102 selects the control method of increasing the transmission rate and the link adaptation control unit 103 increases the transmission rate is larger (or equal to or more) than the second threshold, an instruction to calculate an error rate for rate control may be issued to the rate control error rate calculating unit 111.

Figure 14:
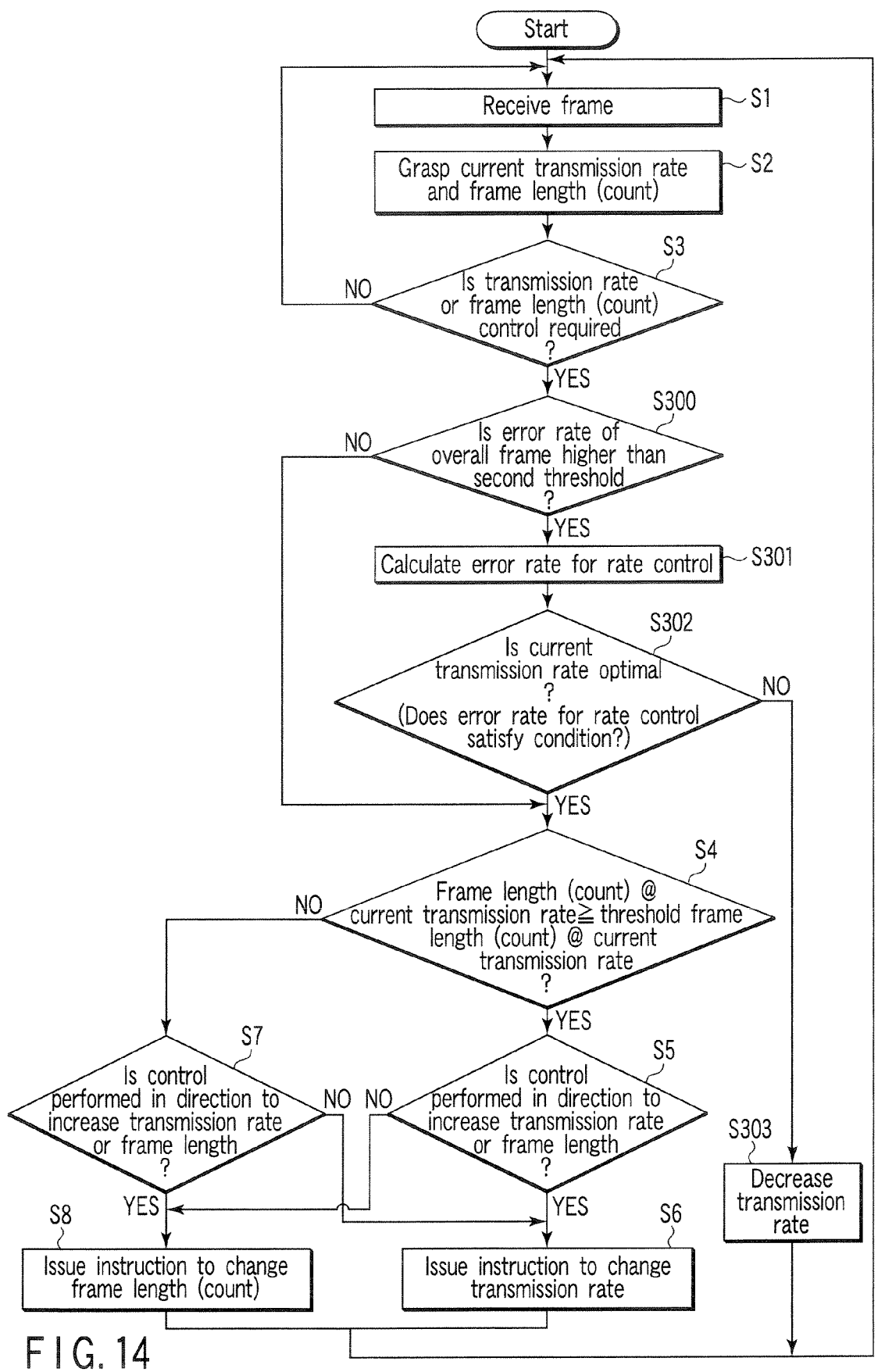
FIG. 14 is a flowchart for explaining a transmission control method in the wireless communication apparatus in FIG. 13.

The processing operation for controlling a frame length and a transmission rate in the wireless communication apparatus in FIG. 13 is shown in FIG. 14. The same reference numerals as in FIG. 14 denote the same parts in FIG. 12. The difference between the operation in FIG. 14 and that in FIG. 12 is that when the channel variation determining unit 6 determines in step S3 whether a wireless channel state is good/bad, and control on a transmission rate/frame length starts, the process advances to step S300. In step S300, the channel variation determining unit 6 compares the error rate of the overall aggregated frame which is calculated at the time of reception of the signal with the second threshold, and issues an instruction to calculate an error rate for rate control to the rate control error rate calculating unit 111 if the calculated error rate is larger (or equal to more) than the second threshold. Upon receiving this instruction, the rate control error rate calculating unit 111 calculates an error rate for rate control by using one of methods (1) to (3) described above (step S301). The subsequent processing is the same as that shown in FIG. 12.

If it is determined in step S300 that the error rate of the overall aggregated frame which is calculated at the time of reception of the signal is equal to or less than the second threshold, the process advances to step S4. The processing operation in step S4 and the subsequent steps is the same as that in FIG. 7.

Referring to FIG. 14, if the error rate of the overall received aggregated frame becomes equal to or more than a predetermined value (e.g., if many errors occur immediately after the link adaptation control unit 103 increases the transmission rate on the basis of the control method selected by the control priority decision unit 102), an error rate for rate control is calculated.

An error rate for rate control is calculated to prevent problems due to long frame lengths. If, therefore, a short frame length is set, there is no need to perform calculation of an error rate for rate control. If a threshold is set in advance for a frame length, and the frame length exceeds (or equal to more than) the threshold, steps S301 and S302 in FIGS. 12 and 14 may be performed to determine on the basis of an error rate for rate control whether the current transmission rate is optimal.

As has been described above, the first to fifth embodiments can easily control an increase/decrease in frame length and transmission rate on the basis of a throughput in accordance with whether a wireless channel state is good/bad (the error rate of a reception frame).

What is claimed is:

1. A wireless communication apparatus comprising:
a frame aggregation unit configured to generate an aggregated frame including a plurality of frames and having a frame length;
a transmission unit configured to transmit the aggregated frame at one transmission rate of a plurality of transmission rates;
a memory to store, for each of the transmission rates, a threshold frame length defining a boundary between a first frame length range and a second frame length range, the threshold frame length being set and defining the boundary such that for a predetermined threshold throughput increase rate,
(1) if the frame length is within the first frame length range and is increased, the predetermined threshold throughput increase rate is met or exceeded, and
(2) if the frame length is within the second frame length range and is increased, the predetermined threshold throughput increase rate is not met;
a selection unit configured to select, by comparing the threshold frame length at the transmission rate with the frame length, at least one of (a) another transmission rate of the transmission rates and (b) a new frame length of the aggregated frame;
a control unit configured to set the transmission rate to the selected another transmission rate if the another transmission rate is selected, and to set the frame length to the new frame length if the new frame length is selected.

2. A wireless communication apparatus comprising:
a frame aggregation unit configured to generate an aggregated frame including a plurality of frames and having a frame length;
a transmission unit configured to transmit the aggregated frame at one transmission rate of a plurality of transmission rates;
a memory to store, for each of the transmission rates, a threshold frame length defining a boundary between a first frame length range and a second frame length range, the threshold frame length being set and defining the boundary such that for a second throughput increase rate assumed when each of the transmission rates is increased,
(1) if the frame length is within the first frame length range, a first throughput increase rate assumed when the frame length is increased is greater than the second throughput increase rate,
(2) if the frame length is within the second frame length range, the second throughput increase rate is greater than a third throughput increase rate assumed when the frame length is increased;
a selection unit configured to select, by comparing the threshold frame length at the transmission rate with the frame length, at least one of (a) another transmission rate of the transmission rates and (b) a new frame length of the aggregated frame;
a control unit configured to set the transmission rate to the selected another transmission rate if the another transmission rate is selected, and to set the frame length to the new frame length if the new frame length is selected.

3. The apparatus according to claim 1, further comprising a determining unit configured to determine a quality of a channel state by receiving an acknowledgement with respect to the aggregated frame transmitted by the transmission unit, and wherein
the selection unit selects at least one of the another transmission rate and the new frame length in accordance with the quality of the channel state.

4. The apparatus according to claim 2, further comprising a determining unit configured to determine a quality of a channel state by receiving an acknowledgement with respect to the aggregated frame transmitted by the transmission unit, and wherein the selection unit selects at least one of the another transmission rate and the new frame length in accordance with the quality of the channel state.

5. The apparatus according to claim 3, wherein when the channel state is determined to be good by the determining unit, the selection unit selects the another transmission rate which is above the transmission rate if the frame length is not less than the threshold frame length at the transmission rate, and selects the new frame length which is above the frame length if the frame length is less than the threshold frame length.

6. The apparatus according to claim 4, wherein when the channel state is determined to be good by the determining unit, the selection unit selects the another transmission rate which is above the transmission rate if the frame length is not less than the threshold frame length at the transmission rate, and selects the new frame length which is above the frame length if the frame length is less than the threshold frame length.

7. The apparatus according to claim 3, wherein when the channel state is determined to be bad by the determining unit, the selection unit selects the new frame length which is below the frame length if the frame length is not less than the threshold frame length at the transmission rate, and selects the another transmission rate which is below the transmission rate if the frame length is less than the threshold frame length.

8. The apparatus according to claim 4, wherein when the channel state is determined to be bad by the determining unit, the selection unit selects the new frame length which is below the frame length if the frame length is not less than the threshold frame length at the transmission rate, and selects the another transmission rate which is below the transmission rate if the frame length is less than the threshold frame length.

9. The apparatus according to claim 3, wherein the determining unit determines that the channel state is good when an error rate of a received aggregated frame is lower than a predetermined threshold error rate, and determines that the channel state is bad when the error rate is not less than the threshold error rate.

10. The apparatus according to claim 4, wherein the determining unit determines that the channel state is good when an error rate of a received aggregated frame is lower than a predetermined threshold error rate, and determines that the channel state is bad when the error rate is not less than the threshold error rate.

11. The apparatus according to claim 3, wherein when the channel state is determined to be good by the determining unit, the selection unit selects the another transmission rate which is above the transmission rate if the frame length is not less than the threshold frame length at the transmission rate, and selects, if the frame length is less than the threshold frame length at the transmission rate, one of (a) the another transmission rate which is above the transmission rate, (b) the new frame length, and (c) a group of the another transmission rate which is above the transmission rate and the new frame length which is below the frame length, based on an amount of data to be transmitted.

12. The apparatus according to claim 4, wherein when the channel state is determined to be good by the determining unit, the selection unit selects the another transmission rate which is above the transmission rate if the frame length is not less than the threshold frame length at the transmission rate, and selects, if the frame length is less than the threshold frame length at the transmission rate, one of (a) the another transmission rate which is above the transmission rate, (b) the new frame length, and (c) a group of the another transmission rate which is above the transmission rate and the new frame length which is below the frame length, based on an amount of data to be transmitted.

13. The apparatus according to claim 3, further comprising a transmission buffer to store data to be transmitted, and wherein when the channel state is determined to be good by the determining unit, the selection unit selects the another transmission rate which is above the transmission rate if the frame length is not less than the threshold frame length at the transmission rate, and selects, if the frame length is less than the threshold frame length at the transmission rate, one of (a) the another transmission rate which is above the transmission rate, (b) the new frame length, and (c) a group of the another transmission rate which is above the transmission rate and the new frame length which is below the frame length, by comparing an amount of data included in the aggregated frame with an amount of data in the transmission buffer.

14. The apparatus according to claim 4, further comprising a transmission buffer to store data to be transmitted, and wherein when the channel state is determined to be good by the determining unit, the selection unit selects the another transmission rate which is above the transmission rate if the frame length is not less than the threshold frame length at the transmission rate, and selects, if the frame length is less than the threshold frame length at the transmission rate, one of (a) the another transmission rate which is above the transmission rate, (b) the new frame length, and (c) a group of the another transmission rate which is above the transmission rate and the new frame length which is below the frame length, by comparing an amount of data included in the aggregated frame with an amount of data in the transmission buffer.

15. The apparatus according to claim 13, wherein the selection unit selects at least one of (a) the another transmission rate which is above the transmission rate and (b) the new frame length which is below the frame length, if the frame length is less than the threshold frame length at the transmission rate and the amount of data in the transmission buffer is smaller than the amount of data included in the aggregated frame.

16. The apparatus according to claim 14, wherein the selection unit selects at least one of (a) the another transmission rate which is above the transmission rate and (b) the new frame length which is below the frame length, if the frame length is less than the threshold frame length at the transmission rate and the amount of data in the transmission buffer is smaller than the amount of data included in the aggregated frame.

17. The apparatus according to claim 13, wherein the selection unit selects the new frame length which is above the frame length, if the frame length is less than the threshold frame length at the transmission rate and the amount of data in the transmission buffer is larger than the amount of data included in the aggregated frame.

18. The apparatus according to claim 14, wherein the selection unit selects the new frame length which is above the frame length, if the frame length is less than the threshold frame length at the transmission rate and the amount of data in the transmission buffer is larger than the amount of data included in the aggregated frame.

19. The apparatus according to claim 1, wherein the selection unit selects the another transmission rate which is below the transmission rate if one of a plurality of conditions is satisfied, and selects, if none of the conditions is satisfied, at least one of the another transmission rate and the new frame length by comparing the threshold frame length of the transmission rate with the frame length, the conditions including (a) a first condition that a first error rate of a front half portion of a received aggregated frame is not less than a predetermined first threshold value, the front half portion extending from a head to a center of the received aggregated frame or from the head to the threshold frame length at the transmission rate, (b) a second condition that a second error rate of the overall received aggregated frame which is obtained by weighting the first error rate is not less than a predetermined second threshold value, and (c) a third condition that the frame length is not less than a predetermined third threshold value.

20. The apparatus according to claim 2, wherein the selection unit selects the another transmission rate which is below the transmission rate if one of a plurality of conditions is satisfied, and selects, if none of the conditions is satisfied, at least one of the another transmission rate and the new frame length by comparing the threshold frame length of the transmission rate with the frame length, the conditions including (a) a first condition that a first error rate of a front half portion of a received aggregated frame is not less than a predetermined first threshold value, the front half portion extending from a head to a center of the received aggregated frame or from the head to the threshold frame length at the transmission rate, (b) a second condition that a second error rate of the overall received aggregated frame which is obtained by weighting the first error rate is not less than a predetermined second threshold value, and (c) a third condition that the frame length is not less than a predetermined third threshold value.

21. A transmission control method for transmitting an aggregated frame including a plurality of frames, comprising:
   generating an aggregated frame having a frame length;
   transmitting the aggregated frame at one transmission rate of a plurality of transmission rates;
   storing, in a memory, for each of the transmission rates, a threshold frame length defining a boundary between a first frame length range and a second frame length range, the threshold frame length being set and defining the boundary such that for a predetermined threshold throughput increase rat;
   (1) if the frame length is within the first frame length range and is increased, the predetermined threshold throughput increase rate is met or exceeded, and
   (2) if the frame length is within the second frame length range and is increased, the predetermined threshold throughput increase rate is not met;
   selecting, by comparing the threshold frame length at the transmission rate with the frame length, at least one of (a) another transmission rate of the transmission rates and (b) a new frame length of the aggregated frame;
   setting the transmission rate to the selected another transmission rate if the another transmission rate is selected, and to set the frame length to the new frame length if the new frame length is selected.

22. A transmission control method for transmitting an aggregated frame including a plurality of frames, comprising:
   generating an aggregated frame having a frame length;
   transmitting the aggregated frame at one transmission rate of a plurality of transmission rates;
   storing, in a memory, for each of the transmission rates, a threshold frame length defining a boundary between a first frame length range and a second frame length range, the threshold frame length being set and defining the boundary such that for a second throughput increase rate assumed when each of the transmission rates is increased,
   (1) if the frame length is within the first frame length range, a first throughput increase rate assumed when the frame length is increased is greater than the second throughput increase rate,
   (2) if the frame length is within the second frame length range, the second throughput increase rate is greater than a third throughput increase rate assumed when the frame length is increased;
   selecting, by comparing the threshold frame length at the transmission rate with the frame length, at least one of (a) another transmission rate of the transmission rates and (b) a new frame length of the aggregated frame;
   setting the transmission rate to the selected another transmission rate if the another transmission rate is selected, and to set the frame length to the new frame length if the new frame length is selected.

23. The method according to claim 21, further comprising determining a quality of a channel state by receiving an acknowledgement with respect to the aggregated frame transmitted by the transmission unit, and wherein
   selecting selects at least one of the another transmission rate and the new frame length in accordance with the quality of the channel state.

24. The method according to claim 22, further comprising determining a quality of a channel state by receiving an acknowledgement with respect to the aggregated frame transmitted by the transmission unit, and wherein
   selecting selects at least one of the another transmission rate and the new frame length in accordance with the quality of the channel state.

25. The method according to claim 23, wherein when the channel state is determined to be good, the selecting selects the another transmission rate which is above the transmission rate if the frame length is not less than the threshold frame length at the transmission rate, and selects the new frame length which is above the frame length if the frame length is less than the threshold frame length.

26. The method according to claim 24, wherein when the channel state is determined to be good, the selecting selects the another transmission rate which is above the transmission rate if the frame length is not less than the threshold frame length at the transmission rate, and selects the new frame length which is above the frame length if the frame length is less than the threshold frame length.

27. The method according to claim 23, wherein when the channel state is determined to be bad, the selecting selects the new frame length which is below the frame length if the frame length is not less than the threshold frame length at the transmission rate, and selects the another transmission rate which is below the transmission rate if the frame length is less than the threshold frame length.

28. The method according to claim 24, wherein when the channel state is determined to be bad, the selecting selects the new frame length which is below the frame length if the frame length is not less than the threshold frame length at the transmission rate, and selects the another transmission rate which is below the transmission rate if the frame length is less than the threshold frame length.

29. The method according to claim 23, wherein the determining determines that the channel state is good when an error rate of a received aggregated frame is lower than a predetermined threshold error rate, and determines that the channel state is bad when the error rate is not less than the threshold error rate.

30. The method according to claim 24, wherein the determining determines that the channel state is good when an error rate of a received aggregated frame is lower than a predetermined threshold error rate, and determines that the channel state is bad when the error rate is not less than the threshold error rate.

31. The method according to claim 23, wherein when the channel state is determined to be good, the selecting selects the another transmission rate which is above the transmission rate if the frame length is not less than the threshold frame length at the transmission rate, and selects, if the frame length is less than the threshold frame length at the transmission rate, at least one of (a) the another transmission rate which is above the transmission rate, (b) the new frame length, and (c) a group of the another transmission rate which is above the transmission rate and the new frame length which is below the frame length, based on an amount of data to be transmitted.

32. The method according to claim 24, wherein when the channel state is determined to be good, the selecting selects the another transmission rate which is above the transmission rate if the frame length is not less than the threshold frame length at the transmission rate, and selects, if the frame length is less than the threshold frame length at the transmission rate, at least one of (a) the another transmission rate which is above the transmission rate, (b) the new frame length, and (c) a group of the another transmission rate which is above the transmission rate and the new frame length which is below the frame length, based on an amount of data to be transmitted.

33. The method according to claim 23, wherein when the channel state is determined to be good, the selecting selects the another transmission rate which is above the transmission rate if the frame length is not less than the threshold frame length at the transmission rate, and selects, if the frame length is less than the threshold frame length at the transmission rate, one of (a) the another transmission rate which is above the transmission rate, (b) the new frame length, and (c) a group of the another transmission rate which is above the transmission rate and the new frame length which is below the frame length, by comparing an amount of data included in the aggregated frame with an amount of data in a transmission buffer which is included in the apparatus and is configured to store data to be transmitted.

34. The method according to claim 24, wherein when the channel state is determined to be good, the selecting selects the another transmission rate which is above the transmission rate if the frame length is not less than the threshold frame length at the transmission rate, and selects, if the frame length is less than the threshold frame length at the transmission rate, one of (a) the another transmission rate which is above the transmission rate, (b) the new frame length, and (c) a group of the another transmission rate which is above the transmission rate and the new frame length which is below the frame length, by comparing an amount of data included in the aggregated frame with an amount of data in a transmission buffer which is included in the apparatus and is configured to store data to be transmitted.

35. The method according to claim 33, wherein the selecting selects at least one of (a) the another transmission rate which is above the transmission rate and (b) the new frame length which is below the frame length, if the frame length is less than the threshold frame length at the transmission rate and the amount of data in the transmission buffer is smaller than the amount of data included in the aggregated frame.

36. The method according to claim 34, wherein the selecting selects at least one of (a) the another transmission rate which is above the transmission rate and (b) the new frame length which is below the frame length, if the frame length is less than the threshold frame length at the transmission rate and the amount of data in the transmission buffer is smaller than the amount of data included in the aggregated frame.

37. The method according to claim 33, wherein the selecting selects the new frame length which is above the frame length, if the frame length is less than the threshold frame length at the transmission rate and the amount of data in the transmission buffer is larger than the amount of data included in the aggregated frame.

38. The method according to claim 34, wherein the selecting selects the new frame length which is above the frame length, if the frame length is less than the threshold frame length at the transmission rate and the amount of data in the transmission buffer is larger than the amount of data included in the aggregated frame.

39. The method according to claim 21, wherein the selecting selects the another transmission rate which is below the transmission rate if one of a plurality of conditions is satisfied, and selects, if none of the conditions is satisfied, at least one of the another transmission rate and the new frame length by comparing the threshold frame length of the transmission rate with the frame length, the conditions including (a) a first condition that a first error rate of a front half portion of a received aggregated frame is not less than a predetermined first threshold value, the front half portion extending from a head to a center of the received aggregated frame or from the head to the threshold frame length at the transmission rate, (b) a second condition that a second error rate of the overall received aggregated frame which is obtained by weighting the first error rate is not less than a predetermined second threshold value, and (c) a third condition that the frame length is not less than a predetermined third threshold value.

40. The method according to claim 22, wherein the selecting selects the another transmission rate which is below the transmission rate if one of a plurality of conditions is satisfied, and selects, if none of the conditions is satisfied, at least one of the another transmission rate and the new frame length by comparing the threshold frame length of the transmission rate with the frame length, the conditions including (a) a first condition that a first error rate of a front half portion of a received aggregated frame is not less than a predetermined first threshold value, the front half portion extending from a head to a center of the received aggregated frame or from the head to the threshold frame length at the transmission rate, (b) a second condition that a second error rate of the overall received aggregated frame which is obtained by weighting the first error rate is not less than a predetermined second threshold value, and (c) a third condition that the frame length is not less than a predetermined third threshold value.

* * * * *